G. H. NOBBS.
TRACTOR.
APPLICATION FILED OCT. 22, 1919.
1,366,020.
Patented Jan. 18, 1921.
2 SHEETS—SHEET 2.
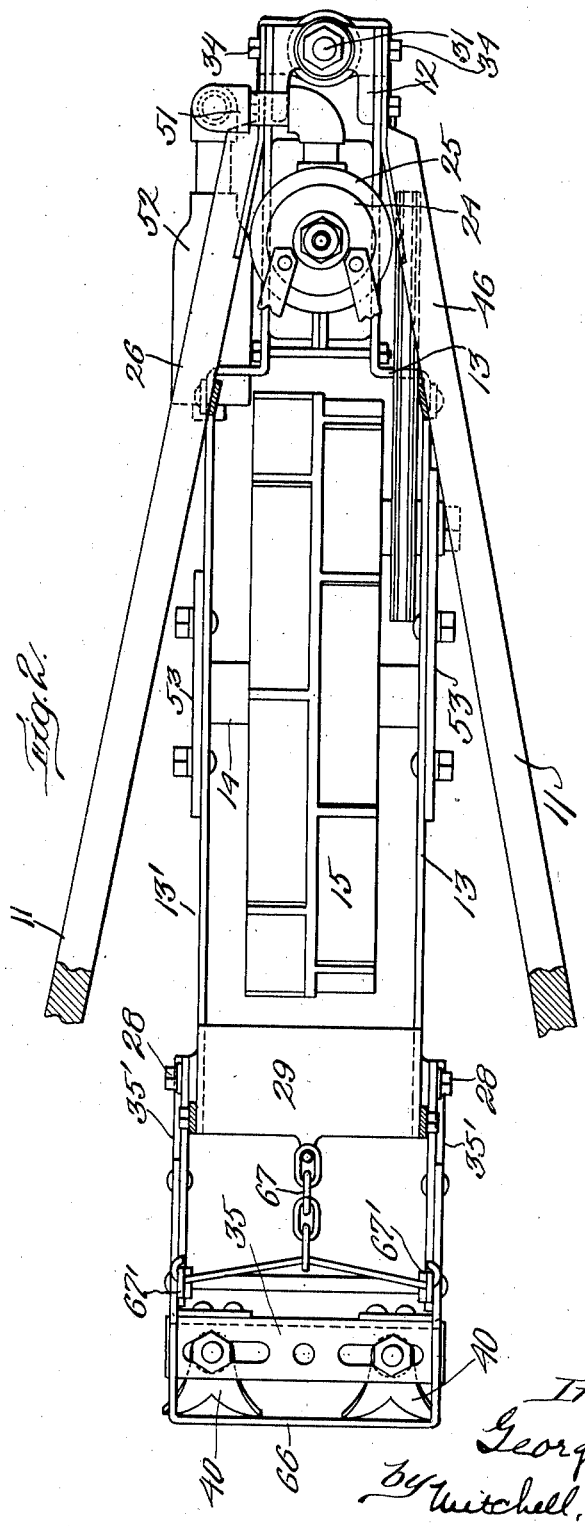
Inventor:
George H. Nobbs
by Mitchell, Chadwick & Kent
attys

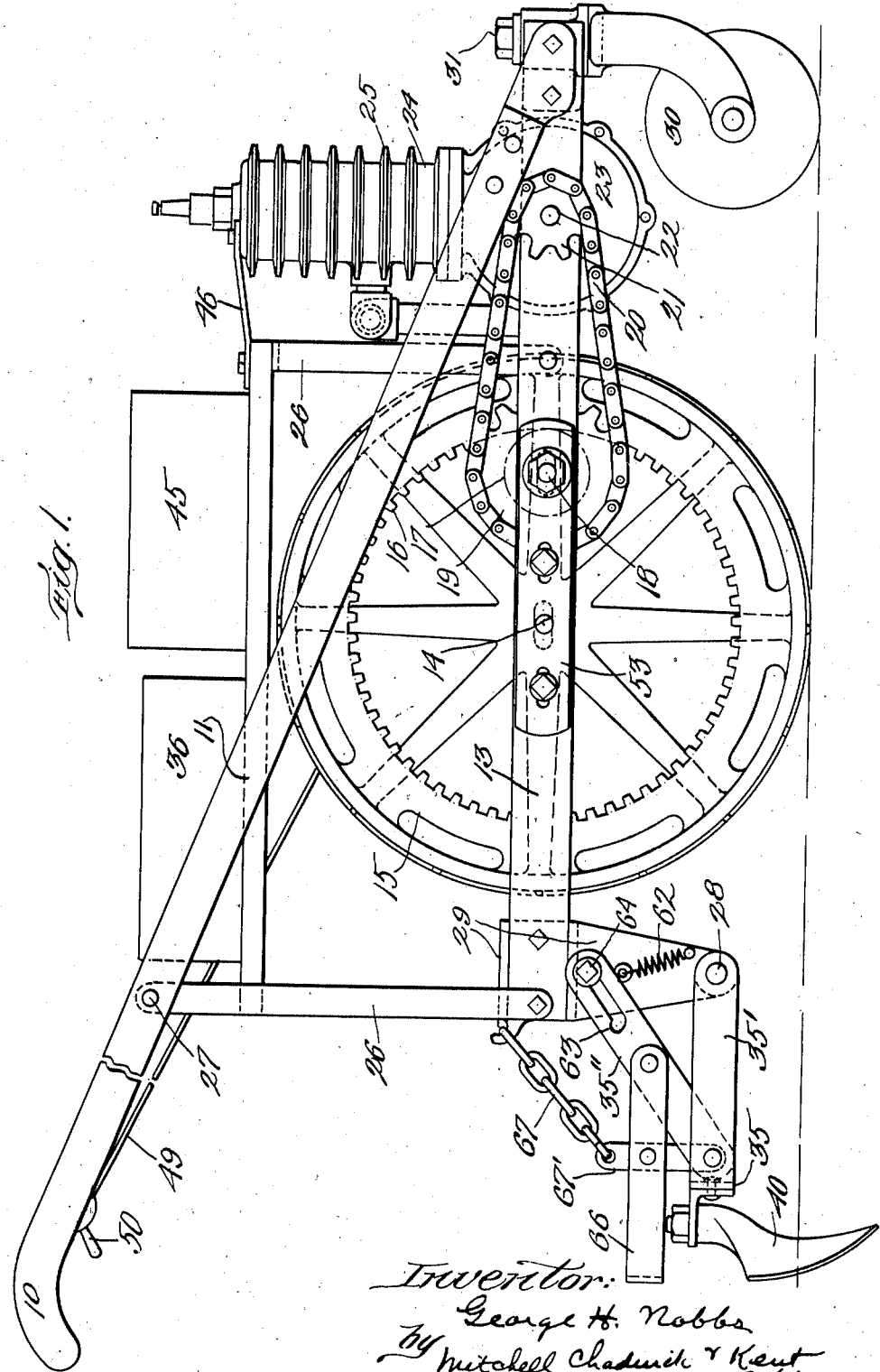

UNITED STATES PATENT OFFICE.

GEORGE H. NOBBS, OF WATERTOWN, MASSACHUSETTS.

TRACTOR.

1,366,020.  Specification of Letters Patent.  Patented Jan. 18, 1921.

Application filed October 22, 1919. Serial No. 332,370.

*To all whom it may concern:*

Be it known that I, GEORGE H. NOBBS, a citizen of the United States, residing at Watertown, in the county of Middlesex and State of Massachusetts, have invented certain new and useful Improvements in Tractors, of which the following is a specification.

This invention relates to improvements in tractors. More particularly it relates to tractors adapted for a variety of agricultural, industrial, domestic and other uses, such as drawing a cultivator or other tool between growing crops, or pushing or carrying a load. It is a species of the invention disclosed by me and broadly claimed in my co-pending application for U. S. Letters Patent Serial No. 319,379, being an improvement in some respects over the species there illustrated. Said application shows a single traction wheel adapted to be guided by a man walking behind it. Such a traction wheel preferably has a frame carrying the engine, and one other wheel support, arranged tandem with it; has no clutch; and has handles on the frame. The frame carries the supply of gasolene and incidentals, and may, if desired, carry a load, although the uses at present contemplated are mainly for traction of a tool or the like. In my said pending application, the species illustrated has the traction wheel at the forward point of a semi-pyramidal frame in which at the rear the upstanding base has handles spread apart at a convenient elevation for the operator to grasp somewhat as in the case of a plow. By depressing these handles, he turns the apparatus on the tandem supporting wheel as on a fulcrum, thus lifting the forward wheel, which is the traction wheel, thus instantly stopping the traction, even though the engine and traction wheel continue running. In this condition, the apparatus may be held or manipulated into a different position.

By the present invention, the traction wheel is arranged in the midst of the semi-pyramidal frame, with the supporting wheel forward of it. A larger part of the weight of the whole apparatus and of its load is thus carried on the traction wheel, making a stronger traction. If desired, the operator may put the whole weight upon the traction wheel, by depressing the handles enough to lift the forward wheel. The drag of the tool working close behind and below the traction wheel, without any intervening support, adds to the tractive power. The traction can, however, be stopped at any time by the operator by lifting on the handles, thus raising the traction wheel from the ground, about the forward wheel as a fulcrum. The apparatus can then be guided into a new position before beginning the traction again by letting the wheel down; and as an aid in this it is preferred to make the forward wheel a caster.

The apparatus of the present species can be used for the various purposes to which the species shown in my said application is applicable, with the distinction that the manipulation to control the traction is by lifting on the handles instead of by pressing down on them, and with the further distinction that as the point of traction on the ground is closer to the point where the tool operates under the rear draw bar, the path of the tool can be directed on a line of shorter curvature. The invention can be applied in various ways other than the precise form illustrated. It is intended that the patent shall cover, by suitable expression in the appended claims, whatever features of patentable novelty exist in the specific form in the invention here disclosed, generic claims being in my other said application for patent.

In the accompanying drawings:

Figure 1 is a side elevation of apparatus embodying the invention; and

Fig. 2 is a plan of the same, with upper parts removed or cut off.

Referring to the drawing, 10 indicates handles conveniently spread, as in a plow or other garden implement, from which the main fore and aft members 11 of a frame converge forward and downward to a short transverse forward head or prow 12 to which are joined also the forward extensions of the main horizontal fore and aft members 13, 13'. The latter members support an axle 14 on which is journaled the traction wheel 15. The details of the journal are not illustrated, as they are no part of this present invention; but for this purpose any suitable arrangement may be employed, as, preferably, by holding the axle stationary in side plates 53 which are mounted on the fore and aft members 13, 13', and by journaling the wheel on the axle, which arrangement gives convenient room for the use of roller bearings. The traction wheel has an internal rack 16 driven by pinion 17 on a stud 18 on the right hand side plate 53, so that the distance between axle 14 and stud 18 is permanently fixed, with the pinion always in proper mesh. This pinion is integral with a large sprocket wheel 19 which is driven by a chain 20 that runs back to it from a small sprocket wheel 21 on the shaft 22 of an engine on the forward part of the frame, the outline of whose crank case 23, cylinder 24, and ribs 25 for air cooling are clearly seen in the drawing. (Fig. 1) with exhaust 51 and muffler 52 (Fig. 2). When the chain 20 requires adjustment it is accomplished by shifting the plates 53, which as illustrated have slots so that they can move a little fore and aft on the side bars 13, 13', in which case the traction wheel and its driving pinion 17 move together, always in mesh. The horizontal side bars 13, 13' are maintained correctly spread at their rear by any suitable means, such as a spreader yoke 29 clamped between them. Said yoke has low set pivots 28 which afford connection for a draw bar 35 holding any tool 40 that is being drawn below the level of the wheel. Uprights 26 and horizontal cross bars 27 are provided as needed, so that the frame can support a battery box 36 and gasolene tank 45; can steady the upper end of the engine as illustrated at 46; and can carry any other matter that may be desired, either as load to be transported or as load to increase the tractive power of the apparatus. At the forward end of the frame is a caster wheel 30 pivotally mounted in the head 12 on the vertical axis indicated at 31. To this head, any apparatus, such as a lawn mower, that is to be pushed by the tractor might be attached, either at the place where the frame bolts 34 are seen or by other suitable arrangement.

The structure thus described constitutes a tractor having a single traction wheel in the midst of the apparatus, with a caster support arranged in tandem forward and a draw bar behind, and with handles still farther behind at a convenient elevation for being grasped by a man walking behind. Such an operator can control the engine by mechanism arranged on the handles, as indicated by the rod 49 and lever 50 which may be taken to signify any needed or desired control apparatus, including a lever for advancing or retarding the ignition spark, a button for cutting it off, and a throttle if desired. Normally the apparatus rests on the traction wheel 15 and the caster wheel 30. The weight of the engine and other parts forward is preferably sufficient to over-balance the weights at the rear, but, if desired, it can be arranged so that this overbalancing is but little, with the total weight almost wholly carried on the traction wheel; or, even, it might be arranged so that the center of gravity is a little to the rear thereof, producing a tendency to raise the caster wheel, which might be useful for some purposes or in some connections. But in the utility for which the apparatus is illustrated this last would be undesirable, because the tool which is being drawn behind the traction wheel does not constitute a support. In either case, however the balance of weight be arranged, the operator can stop the traction at any time without stopping the engine by lifting on the handles 10 so as to lift the traction wheel 15 from the ground. In that case the apparatus will be supported by the caster wheel 30 and the hands of the operator, with the weight mostly on the caster because the center of gravity is nearer to it. In such position, it can be wheeled on the caster wheel, or turned or tipped in turning, as desired, owing to the spread and convenient elevation of the handles 10. If it be desired to arrange the apparatus so that it can be left standing with engine running, supports may be provided to hold the handles and traction wheel lifted. The traction will begin again the instant the operator lets the handles down, unless the engine is stopped, in which case the engine may be started by pushing the apparatus forward with the traction wheel resting on the ground.

Details of construction of the draw bar and devices for attaching various tools thereto and for withdrawing the same from the ground or applying them may be varied at will. As illustrated, the draw bar 35 is sustained by a traction yoke 35' pivoted at 28 at the bottom of the supporting yoke 29. It can be limited in downward swing about this pivot either by the chain 67 or by side links 35''. One of the latter has a slot 62 with notch 63 for engaging a pin 64 on yoke 29 which pin passes loosely through the slot, and latches the link in its elevated position when the notch reaches it. This latch can be released by the operator by stepping on the backward projecting yoke release lever 66, which is itself a yoke having a bar extending across the back of the apparatus. This lever is fulcrumed on the upright bottom links 67', which form part of the attachment of the chain 67. When the rear end of this yoke lever is thus depressed, the forward end, rising, lifts the traction side links 35'' until the pin 64 is out of the notch 63, whereupon the whole tool-holding group that is pivoted at 28 at the bottom of the yoke 29 swings downward until the tool 40 strikes the ground, and until it reaches its working level in case it enters the ground, or until checked by chain 67 or by the end of slot 62. When such a tool is in the ground, it imposes a downward drag on the axle of the traction wheel. In consequence, it increases the traction, by pulling the wheel more firmly against the ground. To raise the tool at any instant, the operator merely lifts the lever 66 with his foot until the notch 63 is latched on the pin 64.

I claim as my invention:—

1. A tractor having in combination a single traction wheel; a frame in which it is journaled; an engine driving it, supported on the frame; a ground support for the frame forward of the traction wheel; a draw bar at the rear of the traction wheel; and rear handles adapted for lifting the traction wheel from the ground.

2. A tractor having in combination a single traction wheel; a frame with a forward caster wheel, in which frame the traction wheel is journaled; an engine driving it, supported on the frame a draw bar at the rear of the traction wheel; and rear handles adapted for lifting the traction wheel from the ground.

3. A tractor comprising the combination with a frame having engine, traction wheel and manipulating handles, of tool attaching means close behind and below the axle of the traction wheel whereby the drag of a tool in the ground is transmitted to said axle with a downward component increasing the traction of the wheel; the said frame having no running ground support to the rear of traction wheel; but having a supplementary ground fulcrum support whereon the traction wheel can be lifted by said handles.

4. A tractor comprising in combination a frame; an engine; a traction wheel journaled in the frame and driven by the engine; a running ground support wheel forward of the traction wheel; and rear handles arranged to transfer weight of the apparatus from the forward support to the traction wheel.

Signed at Boston, Massachusetts, this 21st day of October, 1919.

GEORGE H. NOBBS.